Patented June 19, 1951

2,557,076

UNITED STATES PATENT OFFICE 2,557,076

5-ALKYL-3-PYRIDOLS AND METHOD OF MAKING THEM

Henry Cady Chitwood, Charleston, W. Va., assignor, by mesne assignments, to Union Carbide and Carbon Corporation, a corporation of New York No Drawing. Application October 12, 1949, Serial No. 121,067

6 Claims. (Cl. 260—297)

This invention is concerned with 3-pyridols and a method of making them from certain dialkylolamines.

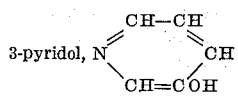

has been described in chemical literature, but no practicable method for manufacturing it has heretofore been proposed, as far as is known.

I have discovered that 3-pyridol and a number of 5-alkyl-3-pyridols can be made by passing certain dialkylolamines in the vapor phase over a hydrogenation-dehydrogenation catalyst at an elevated temperature. Without wishing to be restricted to or bound by any particular theory as to the mechanism of the conversion, the reaction seems to take place according to the following scheme, referring to the conversion of di-(2-hydroxypropyl) amine to 5-methyl-3-pyridol by way of illustration:

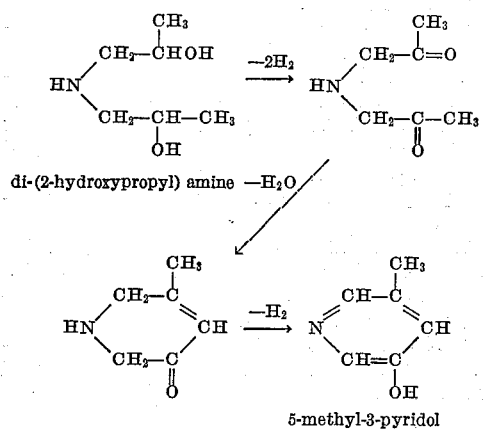

The process can be carried out by passing the dialkylolamine in vapor phase over a conventional hydrogenation-dehydrogenation catalyst of which supported nickel or copper or nickel and copper, promoted with chromium, or platinum are illustrative. For instance, using a conventional nickel catalyst promoted with chromium, di-(2-hydroxypropyl) amine was converted to 5-methyl-3-pyridol in 40 per cent yield. However, I prefer to use a nickel-copper-chromium hydrogenation catalyst which is stabilized for dehydrogenation operation by a small amount of an alkali metal sulfate present therein in a ratio of about 0.3 part per 100 parts of nickel by weight to about 0.33 gram mol per 100 gram atoms of nickel. Such a catalyst containing copper, mostly in the form of metallic copper, in a ratio of about 15 to 40 parts, and chromium, mostly in the form of its oxide, in the ratio of about 0.5 to 4 parts per 100 parts of nickel computed on a metal basis, is described and claimed in copending application filed on or about February 16, 1949, Serial No. 76,852.

The converter can be a length of steel or stainless steel tube containing the catalyst. If desired, the inlet end of the tube can be packed with catalytically inert material to serve as a preheater and vaporizer for the dialkylolamine. The vapors issuing from the converter can be collected by cooling and condensation and the 3-pyridol product isolated by expedients which, in themselves, are well-known, as by distillation and crystallization.

The optimum operating temperature for the production of 3-pyridols over conventional-type hydrogenation catalysts is about 275° to 300° C. Higher and lower temperatures can be used, however. Using the stabilized catalyst, temperatures as high as 350° C. can be used to good advantage.

Di-2-alkylolamines which can be converted to 5-alkyl-3-pyridols according to my process may be represented by the following general formula:

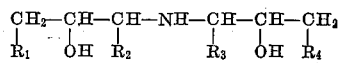

in which each of the 2-alkylol groups contains not more than ten carbon atoms and in which $R_1$, $R_2$, $R_3$ and $R_4$ can be hydrogen, alkyl, aryl, alkaryl, alkoxy or aryloxy. Where the di-2-alkylolamine starting materials are unsymmetrical and contain three or more carbon atoms to the 2-alkanol group, the internal condensation may proceed in two ways to give two isomeric products represented by the following general formulas:

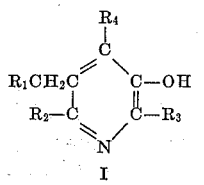 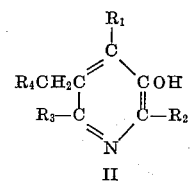

I   II

These isomers are similar in properties and very difficult to separate.

As starting materials for the production of 5-alkyl-3-pyridols, I prefer to use those di-2-alkylolamines in which one of the 2-alkylol groups has not more than three carbon atoms, with the other 2-alkylol group having not more than ten carbon atoms, as represented by the following general formula:

$$RCHOHCH_2NHCH_2CHOHCH_3$$

in which R is methyl, ethyl, propyl, butyl, pentyl, hexyl, heptyl or octyl. Illustrative of these preferred starting materials are di-(2-hydroxypropyl) amine, $NH(CH_2CHOHCH_3)_2$; 2-hydroxybutylamino-2-propanol, $$C_2H_5CHOHCH_2NHCH_2CHOHCH_3$$

2-hydroxypentylamino-2-propanol, and the like, having up to ten carbon atoms in the 2-hydroxyalkyl group attached to the amino-2-propanol group. The 5-alkyl-3-pyridols which are formed are represented by the formulas

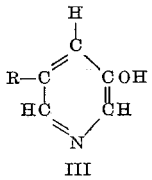

III and

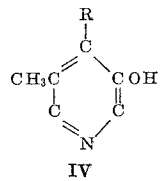

IV wherein R, as above, is an alkyl group of not more than eight carbon atoms. The hydroxyl group is phenolic in nature and the nitrogen atom weakly basic, making the compounds amphoteric in character. Usefulness of these compounds in the manufacture of biologicals and dyes is indicated.

In addition to the di-2-alkylolamines yielding the 5-alkyl-3-pyridols, my process is applicable to 2 - hydroxyethylamino - 2 - propanol for conversion to 3-pyridol, probably in accord with the following scheme:

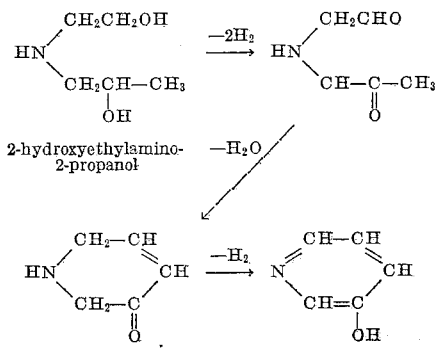

The examples which follow are illustrative.

Example 1

Di-(2-hydroxypropyl) amine in the vapor phase was passed over a hydrogenation-dehydrogenation catalyst maintained at a temperature of 350° C. The catalyst consisted essentially of nickel, copper (mostly in the form of metallic copper), and chromium (mostly in the form of its oxide) in the ratio of 32.6 parts of copper and 1.93 parts of chromium per 100 parts of nickel, on a metal basis, by weight. The catalyst was stabilized for dehydrogenation operation by the presence of 0.58 part of sodium sulfate per 100 parts of nickel. A total of 1013 parts, by weight, of the di-(2-hydroxypropyl) amine was fed at the rate of 115 grams per liter of catalyst per hour. Hydrogen was also introduced into the converter along with the amine at the rate of 200 liters per liter of catalyst per hour.

There was obtained 896 parts of condensate which was separated into the following fractions by distillation:

| Fraction | Temp./Pressure, °C./mm. | Weight, gms. | Remarks |
|---|---|---|---|
| 1 | 50°/100--74°/10 | 141 | mostly water. |
| 2 | 74°/10--130°/10 | 15 | Do. |
| 3 | 130°/10--130°/2 | 24 | Do. |
| 4 | 130°/2--135°/2 | 34 | F. Pt. 87° C. |
| 5 | 135°/2--150°/2 | 482 | F. Pt. 122° C. |
| 6 | 150°/2--160°/2 | 25 | F. Pt. 61° C. |
| 7 | 160°/2--190°/4 | 35 | Flask Temp. 304° C. (decomposing). |
| 8 | Residue | 66 | Tar. |
| 9 | Cold trap | 14 / 37 | Oil. / Water. |
| | Total | 873 | |

Fractions 4 and 5 were combined and added to 700 milliliters of benzene which was heated to boiling and then cooled to 10° C. Crystals of 5-methyl-3-pyridol formed which were separated, and again treated in the same manner with benzene. The resulting crystals were then filtered out and washed with cold benzene until the yellow color was removed. There was obtained 373 parts of dry crystals, and another 7.5 parts was obtained from fraction 6 by similar treatment. At this stage the product was substantially pure as indicated by its melting point of 134°–136° C., but it still had a light brownish color. Recrystallization from water containing a trace of hydrochloric acid, after treatment with decolorizing charcoal (Darco) to remove color, gave nearly colorless, glistening crystals in 92.5 per cent recovery. The total yield of recrystallized 5-methyl 3-pyridol was 352 parts, corresponding to a yield 41.7 per cent of theory.

5-methyl-3-pyridol is a white solid which crystallizes in large prisms from water. Its melting point is 134° to 136° C. It distills at a temperature of 153° C. at a pressure of five millimeters of mercury, absolute. It is very soluble in polar organic solvents but very slightly so in ethers and hydrocarbons. With ferric chloride solution it gives a purple coloration. Although nearly insoluble in cold water it dissolves on addition of either acid or alkali. Its susceptibility to oxidation is indicated by darkening in contact with air. The darkening is more pronounced in the crude product and especially when in solution. A trace of hydrochloric acid stabilized the compound against oxidation. 5-methyl-3-pyridol forms a picrate melting at 187°–188° C.

Example 2

The catalyst of Example 1 was reactivated by heating it in a stream of air for a period of four hours at 350° C. and thereafter treating it with hydrogen for a period of eight hours at 375° C. A run similar to the procedure of Example 1 was carried out over the reactivated catalyst over a period of 10.5 hours. The yield of pure 5-methyl-3-pyridol was 58 per cent of the theoretical.

Example 3

Another similar run for a period of 5 hours immediately following the run of Example 2 gave a yield of pure 5-methyl-3-pyridol which was 55 per cent of the theoretical.

Example 4

A run was made with a freshly reactivated catalyst similar to that used in Examples 1 and 2, using a feed rate of 134 grams of di-(2-hydroxypropyl) amine per liter of catalyst per hour, with the catalyst maintained at a temperature of 300° C. The yield of pure 5-methyl-3-pyridol was 42 per cent of the theoretical.

Example 5

A run similar to that of Example 1 was made using a nickel catalyst prepared by dipping porous, bonded silica (Filtros) as a catalyst support in a concentrated solution of nickel and chromium, as nitrates, alternated with roasting. The metals were present in the ratio of fifty parts of nickel to one part of chromium on a contained metal basis by weight, and the final roasted catalyst contained about seven per cent by weight of nickel.

The catalyst was introduced into the converter and reduced in a stream of hydrogen for a period of eight hours at 350° C. The di-(2-hydroxypropyl) amine was fed at the rate of 120 grams per liter of catalyst per hour. Hydrogen was supplied at the rate of 170 liters per liter of catalyst per hour. The converter temperature was 300° C. The overall yield of pure 5-methyl-3-pyridol was 40 per cent of theoretical.

At higher temperatures with the nickel catalyst, the tar formation was excessive and tended to obstruct the flow through the converter.

Example 6

A run similar to Example 5 was made over a copper catalyst promoted with two per cent of chromium based on the weight of the copper. It was prepared by dipping the catalyst support into the nitrate of the metals in a manner similar to that described in Example 5.

Example 7

Hydroxyethylamino-2-propanol in the vapor phase was passed over a hydrogenation-dehydrogenation catalyst maintained at a temperature of 350° C. The compound distilled at a temperature of 129° C. at a pressure of 5 millimeters of mercury, absolute. It had a density $$\left(\frac{30}{15.6}\right)$$

of 1.046; a refractive index $(n_D^{30})$ of 1.4660 and a molecular refraction of 3.16 observed, 31.9 calculated.

From 917 parts of hydroxyethylamino-2-propanol fed, a condensate of 701 parts was obtained. On distillation of the condensate at 5 millimeters of mercury absolute pressure, there was obtained a considerable first fraction of low boiling material, 157 parts of distillate boiling at 135° to 140° C. and 49 parts of distillate boiling at 140° to 150° C. The former distillate froze at 44° C. and from it there was isolated by filtration and recrystallization, 20 parts of pure 3-pyridol. The 3-pyridol was identified by its melting point of 126° C., and that of its oxalate, 175° C. An estimated additional 50 parts was contained in the two remaining distillation fractions. The estimated yield was 10 per cent of theory.

What is claimed is:

1. A method of making a 5-alkyl-3-pyridol which comprises passing a di-2-alkylolamine having not more than ten carbon atoms to the alkylol groups thereof in the vapor phase over a hydrogenation - dehydrogenation catalyst at a temperature below the decomposition temperature of the 5-alkyl-3-pyridol and not lower than the boiling temperature at normal pressure of the di-2-alkylolamine, said temperature within such range also being sufficiently high to cause the splitting out of water with consequent ring formation and also the evolution of hydrogen.

2. A method of making a 5-alkyl-3-pyridol wherein the alkyl group contains not more than eight carbon atoms which comprises passing a 2-hydroxyalkylamino-2-propanol having not more than ten carbon atoms in the hydroxyalkyl group in the vapor phase over a hydrogenation-dehydrogenation catalyst at a temperature below the decomposition temperature of the 5-alkyl-3-pyridol and not lower than the boiling temperature at normal pressure of the di-2-alkylolamine, said temperature within such range also being sufficiently high to cause the splitting out of water with consequent ring formation and also the evolution of hydrogen.

3. A method of making a 5-alkyl-3-pyridol wherein the alkyl group contains not more than eight carbon atoms which comprises passing a 2-hydroxyalkylamino-2-propanol having not more than ten carbon atoms in the hydroxyalkyl group in the vapor phase over a hydrogenation-dehydrogenation catalyst at a temperature of 275° to 350° C.

4. A method of making 5-methyl-3-pyridol which comprises passing di(2-hydroxypropyl) amine over a hydrogenation-dehydrogenation catalyst at a temperature of about 275° to 350° C.

5. A method of making 3-pyridol which comprises passing hydroxyethylamino-2-propanol over a hydrogenation-dehydrogenation catalyst at a temperature of about 275° to 350° C.

6. A method of making a compound of the formula

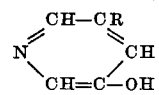

in which R is hydrogen or methyl which comprises passing a di-2-alkylolamine of the formula

in which R is as stated above over a hydrogenation-dehydrogenation catalyst at a temperature of about 275° to 350° C.

HENRY CADY CHITWOOD.

REFERENCES CITED

The following references are of record in the file of this patent:

Parker et al., J. Am. Chem. Soc., 69, pp. 63–67 (1947).

Beilstein, Vierte Auflage, vol. 21, page 46.